US008781646B2

(12) United States Patent
Cheng et al.

(10) Patent No.: US 8,781,646 B2
(45) Date of Patent: Jul. 15, 2014

(54) DETECTING AN ABNORMAL DRIVING CONDITION

(71) Applicant: International Business Machines Corporation, Armonk, NY (US)

(72) Inventors: Xin Hao Cheng, Shanghai (CN); Guoqiang Hu, Shanghai (CN); Li Jun Mei, Beijing (CN); Bo Yang, Beijing (CN); Yu Yuan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/950,349

(22) Filed: Jul. 25, 2013

(65) Prior Publication Data

US 2014/0035773 A1    Feb. 6, 2014

(30) Foreign Application Priority Data

Jul. 31, 2012   (CN) .......................... 2012 1 0270010

(51) Int. Cl.
*G05D 1/00*    (2006.01)

(52) U.S. Cl.
USPC .................. 701/1; 701/46; 701/47; 701/29.1; 701/424; 340/438; 340/439

(58) Field of Classification Search
USPC .......................... 701/1, 46, 47, 90, 29.1, 424; 340/426.16, 438, 439
See application file for complete search history.

(56) References Cited

U.S. PATENT DOCUMENTS

| | | | |
|---|---|---|---|
| 6,178,372 B1 * | 1/2001 | Tabata et al. | 701/97 |
| 6,186,259 B1 * | 2/2001 | Shimizu et al. | 180/204 |
| 6,630,891 B1 | 10/2003 | Dilling | |
| 7,705,748 B2 | 4/2010 | Fu | |
| 8,423,232 B2 * | 4/2013 | Tsutsumi et al. | 701/29.7 |
| 2011/0098881 A1 * | 4/2011 | Tsutsumi et al. | 701/34 |

* cited by examiner

*Primary Examiner* — Gertrude Arthur Jeanglaud
(74) *Attorney, Agent, or Firm* — Cantor Colburn LLP

(57) ABSTRACT

A method of detecting an abnormal driving includes receiving a RF signal transmitted from a vehicle in front; performing digital down conversion on the RF signal to obtain a baseband digital signal; performing frequency shift detection on the baseband digital signal to obtain frequency shift between the received RF signal and the RF signal transmitted from the vehicle in front; and determining that the abnormal driving condition in front exists response to determining that the frequency shift has reached a set threshold.

6 Claims, 6 Drawing Sheets

DETECTING AN ABNORMAL DRIVING CONDITION

PRIORITY

This application claims priority to Chinese Patent Application No. 201210270010.8, filed Jul. 31, 2012, and all the benefits accruing therefrom under 35 U.S.C. §119, the contents of which in its entirety are herein incorporated by reference.

BACKGROUND

The present invention relates generally to an in-vehicle device, and more specifically, to a method and apparatus of detecting abnormal driving condition.

Currently, traffic accidents such as vehicle rear-end collisions often occur, with rear-end collisions making up a large proportion of all traffic accidents. Anti-collision systems in current vehicles can be divided into two types: (1) radar or sonar based probing devices, and (2) communication network based anti-collision systems. A radar or sonar principal based probing apparatus transmits light, electromagnetic or ultrasonic waves toward a certain direction. These waves then reflect when they encounter an obstacle, wherein the reflected waves may be detected by the probing apparatus. The distance of the obstacle relative to the probing apparatus may be computed based on the time difference between wave transmission and wave reception. The speed of the obstacle relative to the probing apparatus may be estimated by measuring Doppler frequency shift of the received reflected waves.

However, such an apparatus is structurally complicated with a high implementation cost, and can only detect objects directly exposed in the line of sight. In the case of a freeway environment, the can only detect vehicles directly in front, and can not sense those vehicles further in front spaced by other vehicles.

A communication network based anti-collision system can be further divided into two sub-types. One is an anti-collision system that conducts inter-vehicle communication based on an ad-hoc network. During driving conditions, vehicles in a certain scope communicate information via a temporary network formed by wireless communication. Due to uncertainties in network member and channel access of the ad-hoc network itself, implementing such an application as vehicle collision alert with high real-time requirement on this type of network needs to concurrently implement a perfect communication QoS (Quality of Service) assurance mechanism; thus, its implementation complexity and cost are both very high.

The other is an anti-collision system based on fixedly deployed wireless network infrastructures (e.g., GPRS, 3G, WiFi). This system continuously collects instant vehicle information into a control center, and then distributes or broadcasts relevant information to individual vehicles based on a collective process and analysis of the control center. This type of implementation depends on a perfect infrastructure construction. Further, since communication links are processed by a back-end control central, there is a large delay during the entire transmission. Thus, it is not suitable for applications with very high real-time requirement.

Thus, there is a need for a method that helps avoid vehicle rear-end collisions, which can be easily implemented and can meet real-time requirements.

SUMMARY

In one embodiment, a method of detecting an abnormal driving includes receiving a RF signal transmitted from a vehicle in front; performing digital down conversion on the RF signal to obtain a baseband digital signal; performing frequency shift detection on the baseband digital signal to obtain frequency shift between the received RF signal and the RF signal transmitted from the vehicle in front; and determining that the abnormal driving condition in front exists response to determining that the frequency shift has reached a set threshold.

In another embodiment, an apparatus for detecting an abnormal driving condition includes a receiving module configured to receive a RF signal transmitted from a vehicle in front; a digital down conversion module configured to perform digital down conversion on the RF signal to obtain a baseband digital signal; a frequency shift detection module configured to perform frequency shift detection on the baseband digital signal to obtain frequency shift between the received RF signal and the RF signal transmitted from the vehicle in front; a frequency comparison module configured to determine whether the frequency shift reaches a set threshold; and a determining module configured to determine the abnormal driving condition in front exists response to determining that the frequency shift has reached the set threshold.

BRIEF DESCRIPTION OF THE SEVERAL VIEWS OF THE DRAWINGS

Through the more detailed description of some embodiments of the present disclosure in the accompanying drawings, the invention per se, exemplary embodiments and objects and advantages of the invention will be better understood, wherein.

DETAILED DESCRIPTION

In view of the above, the invention embodiments provide a method and apparatus for detecting an abnormal driving condition. The method of detecting abnormal driving condition according to embodiments of the invention is simple and easy to implement and can meet real-time requirement, thereby effectively preventing a vehicle from rear-end collision.

Exemplary embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
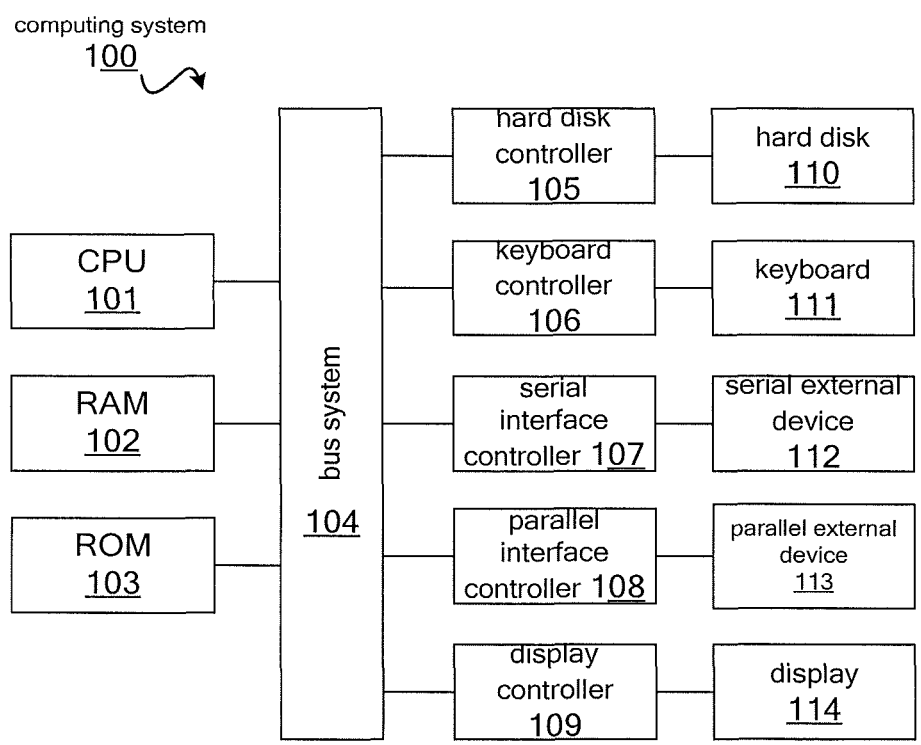
FIG. 1 shows a block diagram of an exemplary computer system which is applicable to implement the embodiments of the present invention.

FIG. 1 shows an exemplary computer system 100 which is applicable to implement the embodiments of the present invention. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
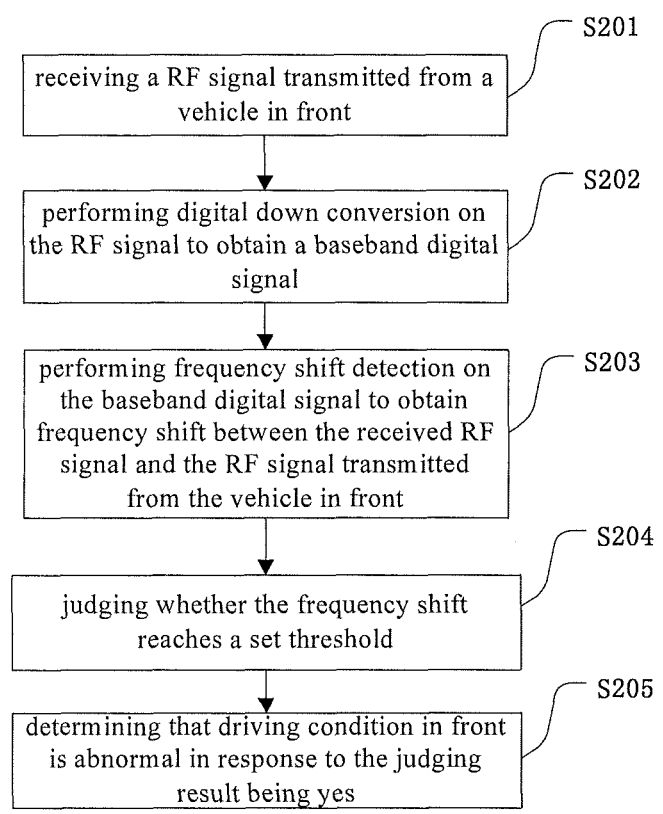
FIG. 2 shows a method of detecting abnormal driving condition according to an embodiment of the invention.

FIG. 2 shows a method of detecting abnormal driving condition according to an embodiment of the invention, the method including: in operation S201, receiving a RF signal transmitted from a vehicle in front; in operation S202, performing digital down conversion on the RF signal to obtain a baseband digital signal; in operation S203, performing frequency shift detection on the baseband digital signal to obtain frequency shift between the received RF signal and the RF signal transmitted from the vehicle in front; in operation S204, judging whether the frequency shift reaches a set threshold; in operation S205, determining that driving condition in front is abnormal in response to the judging result being yes.

Figure 3:
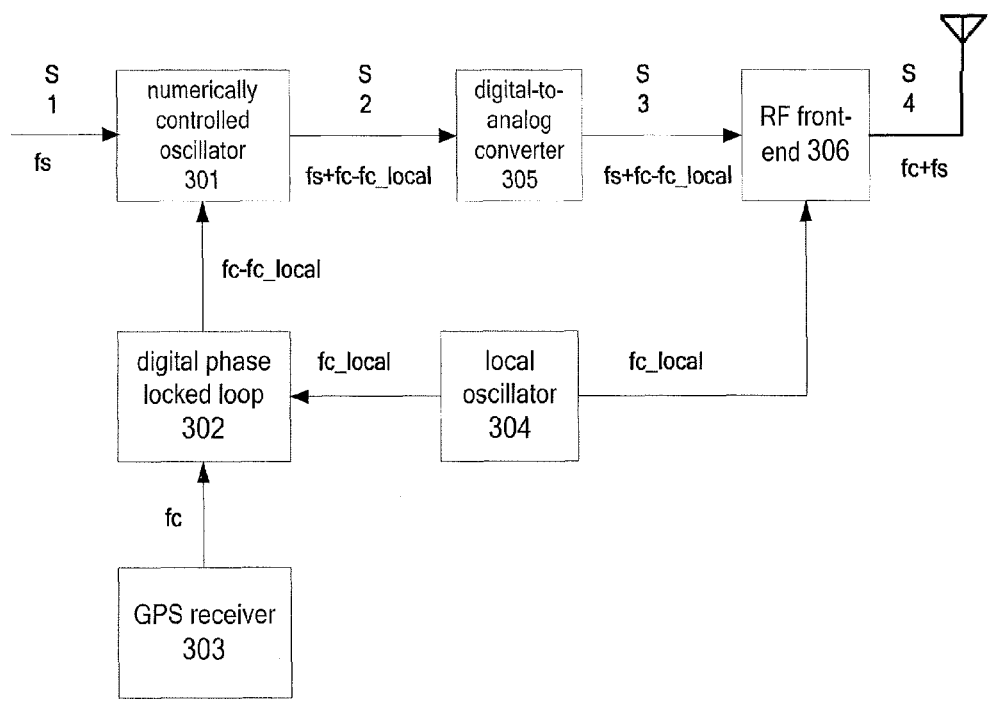
FIG. 3 shows an implementation block diagram of an in-vehicle transmitter for detecting abnormal driving condition according to an embodiment of the invention.

In operation S201, receiving a RF signal transmitted from a vehicle in front. According to an embodiment of the invention, a transmitter at the vehicle in front continuously transmits backward a RF signal via a directional antenna. The transmitter and receiver have negotiated in advance a fixed RF carrier frequency fc and a reference modulation frequency fs of baseband digital signal, wherein, fc>>fs. FIG. 3 shows an implementation block diagram of an in-vehicle transmitter for detecting abnormal driving condition according to an embodiment of the invention, wherein S1 is a digital baseband signal modulated on frequency fs, S1 may be a pseudo random sequence or a complex single tone. At transmitter side, a local oscillator (LO) 304 generates carrier frequency fc_local. Carrier frequencies of different transceivers originate from their own local oscillators, and have a certain frequency shift with reference carrier frequency fc, thus such frequency shift needs to be corrected by a digital phase locked loop (DPLL) based on a reference clock signal provided by a GPS receiver, so as to ensure that air-interface signals from different transmitters are carried on accurate carrier frequency fc. The digital phase locked loop 302 obtains, based on a reference clock from the local oscillator 304 and a standard reference clock from the GPS receiver 303, frequency shift fc−fc_local, i.e., frequency error of the transmitter relative to the agreed carrier frequency fc. The frequency shift is taken as input of a numerically controlled oscillator (NCO) 301, so as to perform digital frequency correction on the baseband digital signal S1 to be transmitted, and the corrected baseband reference signal S2 is modulated at frequency fs+fc−fc_local. Then, it is converted into an analog signal S3 via a digital-to-analog converter 305 and taken as input of an analog RF front-end 306. Carrier frequency of RF front-end is fc_local generated based on local oscillation reference frequency. The analog signal S3 modulates the carrier and results in an output signal S4 with a frequency of fc_local+(fs+fc−fc_local)=fs+fc that is further transmitted via RF air-interface. This mechanism ensures that baseband reference signals from different transmitters are accurately transmitted on carrier fc.

Figure 4:
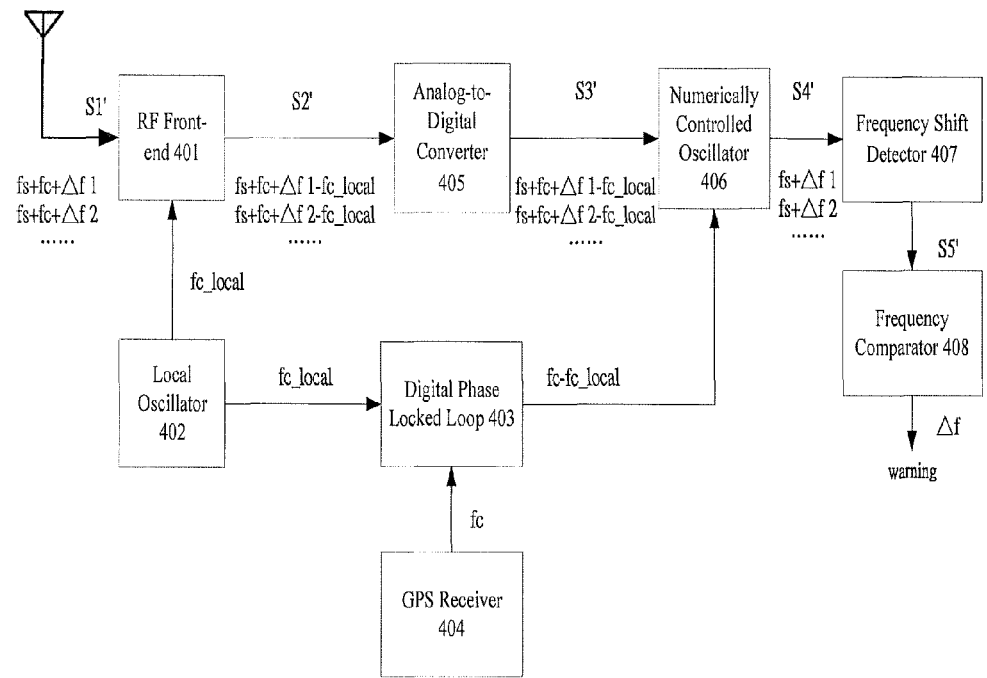
FIG. 4 shows an implementation block diagram of an in-vehicle receiver for detecting abnormal driving condition according to an embodiment of the invention.

In operation S202, the method includes performing digital down conversion on the RF signal to obtain a baseband digital signal. FIG. 4 shows an implementation block diagram of an in-vehicle receiver for detecting abnormal driving condition according to an embodiment of the invention. Wherein, functions of the local oscillator, digital phase locked lock and numerically controlled oscillator are the same as counterparts of the transmitter in FIG. 3, and description of which will be omitted for brevity. An RF front-end 401 of the receiver receives multi-channel mixed signal S1'. Wherein, frequency of each signal is fs+fc+Δfi, (1<=i<=N), Δfi represents Doppler frequency shift corresponding to RF signals received by current vehicle and transmitted from the i-$^{th}$ vehicle among N vehicles in front. After fs+fc+Δfi is mixed in frequency with local oscillation frequency fc_local from local oscillator 402 in a frequency mixer of the RF front-end, frequency of output signal S2' is changed to fs+fc+Δfi−fc_local. The signal S2' is converted into a digital signal S3' via an analog-to-digital converter 405, and a digital phase locked loop 403 obtains frequency shift fc−fc_local based on a reference clock from a local oscillator 402 and a standard reference clock from a GPS receiver 404. A numerically controlled oscillator (NCO) 406 offloads the digital signal S3' from fc carrier based on the digital signal S3' and the frequency shift fc−fc_local, thereby changing frequency of the outputted digital baseband signal S4' to (fs+fc+Δfi−fc_local)−(fc−fc_local)=fs+Δfi, (1<=i<=N).

Further, the baseband digital signal S4' is inputted to a frequency shift detector 407, according to an embodiment of the invention, interference clutter may be removed via a low pass filter before inputting the baseband digital signal S4' to the frequency shift detector 407, thereby obtaining clean baseband digital signal S5.

Operation S203 of performing frequency shift detection on the baseband digital signal to obtain frequency shift between the received RF signal and the RF signal transmitted from the vehicle in front is implemented in the frequency shift detector 407. A receiver at current vehicle receives RF signals transmitted from transmitters of N vehicles in front. Since speed of each vehicle relative to the current vehicle is different, the generated frequency shift Δf is also different. Here, frequency shift is computed by using Doppler effect. The principal of the Doppler effect is that, when there is a relative movement between a transmitting source and a receiving object, frequency of information received by the receiving object transmitted from the transmitting source is different from frequency of information transmitted from the transmitting source. This phenomenon is known as the Doppler effect. Difference between receiving frequency and transmitting frequency is called as Doppler shift. Doppler effect also exists in propagation of wave, when there is a relative movement between a wave source and an receiving object, Doppler shift Δf exists between frequency f' of wave received by the receiving object and frequency f of the wave source, that is:

$$\Delta f = f' - f$$

When the receiving object and the wave source are approaching each other, receiving frequency f' is greater than transmitting frequency f, i.e., Δf>0.

When the receiving object and the wave source are leaving each other, receiving frequency f' is smaller than transmitting frequency f, i.e., Δf<0.

It is proved that, if the speed at which the receiving object and the wave source are approaching or leaving each other is v and wave speed is c (c>>v), then the Doppler shift of the wave received by the receiving object is:

$$\Delta f = f' - f = f \cdot v / c,$$

wherein, v is speed of the receiving object relative to the wave source, the speed is positive when both are approaching each other, and the speed is negative when both are leaving each other.

According to an embodiment of the invention, frequency shift detection on the baseband digital signal may be achieved in time domain, the method comprises: obtaining adjacent first sample point and second sample point of the baseband digital signal; representing the first sample point as a first complex vector; representing the second sample point as a second complex vector; computing phase difference between the first complex vector and the second complex vector; computing frequency shift between the received RF signal and the RF signal transmitted from the vehicle in front based on the phase difference.

According to another embodiment of the invention, it may be achieved that frequency shift detection on the baseband digital signal may be performed in time domain, the method comprises: obtaining a plurality of continuous sample points of the baseband digital signal; representing the plurality of continuous sample points as complex vectors; computing phase differences between complex vectors corresponding to adjacent sample points in the plurality of continuous sample points; performing weighted averaging on the phase differences to obtain average phase difference; computing frequency shift between the received RF signal and the RF signal transmitted from the vehicle in front based on the average phase difference.

Figure 5:
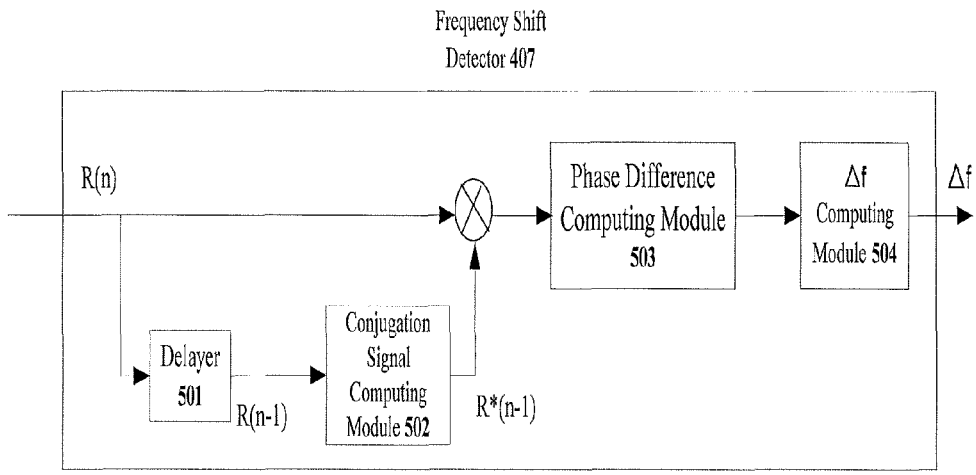
FIG. 5 shows a block diagram of performing frequency shift detection according to a first embodiment of the invention.

FIG. 5 shows a block diagram of performing frequency shift detection according to a first embodiment of the invention. A digital complex single signal is taken as an example of the digital baseband signal S1 inputted by a transmitter NCO, and the digital complex single signal is a discrete signal generated by sampling continuous complex single tone. Frequency of continuous complex single signal x(t) is $f_s$, and x(t) is represented as:

$$x(t) = \cos(2\pi f_s t) + j \sin(2\pi f_s t); \tag{1}$$

Frequency of digital sampling is $f_k$, ($f_k \geq 2f_s$), and the generated digital complex single signal is:

$$x(n) = \cos\left(\frac{2\pi n f_s}{f_k}\right) + j\sin\left(\frac{2\pi n f_s}{f_k}\right); \tag{2}$$

Complex vector R(n−1) of a sample point adjacent to complex vector R(n) of the baseband digital signal is acquired via a delayer 501:

$$R(n) = \cos\left(\frac{2\pi n(f_s + \Delta f)}{f_k}\right) + j\sin\left(\frac{2\pi n(f_s + \Delta f)}{f_k}\right); \tag{3}$$

$$R(n-1) = \cos\left(\frac{2\pi(n-1)(f_s + \Delta f)}{f_k}\right) + j\sin\left(\frac{2\pi(n-1)(f_s + \Delta f)}{f_k}\right); \tag{4}$$

Conjugation R*(n−1) of R(n−1) is obtained via a conjugation signal computing module 502, and auto-correlation process is performed on R(n) and R(n−1), that is, conjugations of R(n) and R(n−1) are multiplied to obtain D(n), $$D(n) = R(n) \cdot R^*(n-1) = \cos\left(\frac{2\pi(f_s + \Delta f)}{f_k}\right) + j\sin\left(\frac{2\pi(f_s + \Delta f)}{f_k}\right); \tag{5}$$

Phase difference θ of complex vector R(n) and R(n−1) may be obtained via a phase difference computing module 503, $$\theta = \frac{2\pi(f_s + \Delta f)}{f_k}; \tag{6}$$

Finally, Δf is computed based on θ via a Δf computing module 504, $$\Delta f = \frac{\theta \cdot f_k}{2\pi} - f_s; \tag{7}$$

Figure 6:
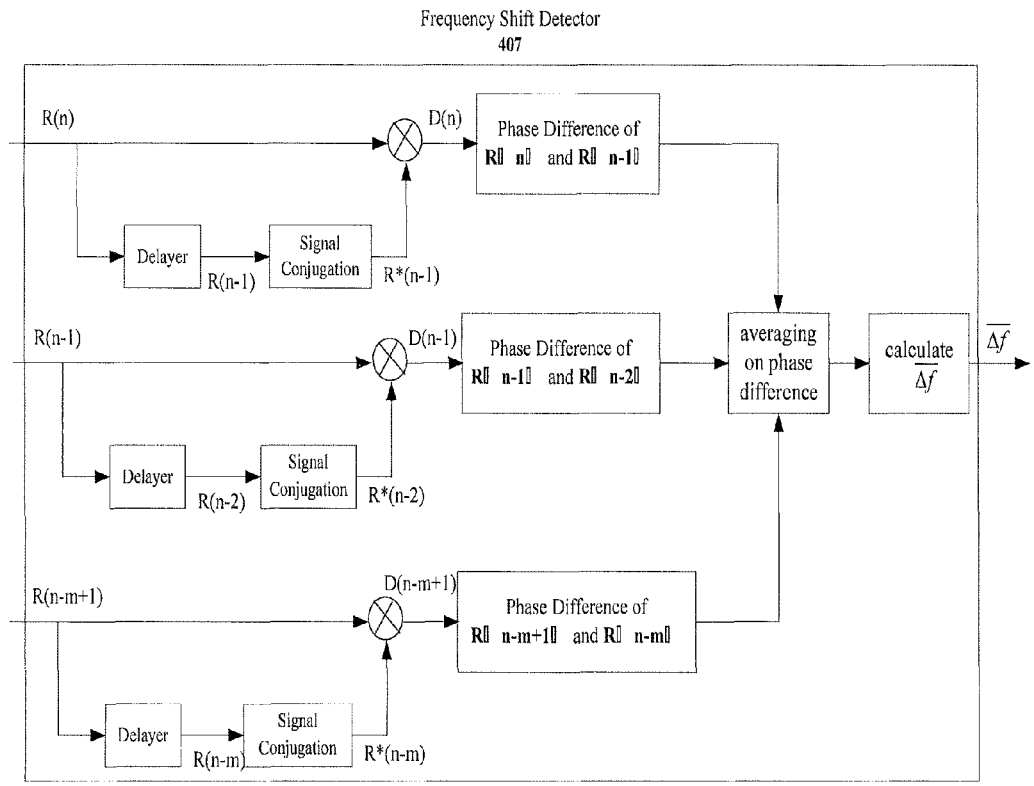
FIG. 6 shows a block diagram of performing frequency shift detection according to a second embodiment of the invention.

FIG. 6 shows a block diagram of performing frequency shift detection according to a second embodiment of the invention. Wherein, m continuous sample points of the baseband digital signal are acquired, and the m continuous sample points are represents as complex vectors, auto-correlation process is performed on complex vectors corresponding to adjacent sample points to obtain D(n), D(n−1), . . . D(n−m+1). D(n) may be obtained based on the above formula (5), and D(n−1), . . . D(n−m+1) may be obtained in a similar way, $$D(n-1) = \tag{8}$$
$$R(n-1) \cdot R^*(n-2) = \cos\left(\frac{2\pi(f_s + \Delta f)}{f_k}\right) + j\sin\left(\frac{2\pi(f_s + \Delta f)}{f_k}\right);$$

$$D(n-m+1) = \tag{9}$$
$$R(n-m+1) \cdot R^*(n-m) = \cos\left(\frac{2\pi(f_s + \Delta f)}{f_k}\right) + j\sin\left(\frac{2\pi(f_s + \Delta f)}{f_k}\right);$$

Phase differences $\theta, \theta_1, \ldots \theta_{m-1}$ between two complex vectors corresponding to adjacent sample points are obtained based on D(n), D(n−1), . . . D(n−m+1), and phase differences $\theta, \theta_1, \ldots \theta_{m-1}$ are further weighted-averaged to obtain $\overline{\theta}$, $$\overline{\theta} = \frac{\theta + \theta_1 + \ldots \theta_{m-1}}{m} = \frac{2\pi(f_s + \Delta f)}{f_k}; \tag{10}$$

And, $\overline{\Delta f}$ is further computed, $$\overline{\Delta f} = \frac{\overline{\theta} \cdot f_k}{2\pi} - f_s, \tag{11}$$

$\overline{\Delta f}$ is taken as frequency shift Δf between the received RF signal and the RF signal transmitted from the vehicle in front.

According to an embodiment of the invention, frequency shift detection on the baseband digital signal may be performed in frequency domain, the method comprises: obtaining sample points of the baseband digital signal; performing time frequency transformation on the sample points of the baseband digital signal to obtain a set of amplitudes corresponding to a set of frequency points; comparing the amplitudes with a preset valid amplitude; filtering out frequency points corresponding to amplitudes which are greater than the valid amplitude, so as to remove interference of random noise; computing frequency difference for each of the filtered-out frequency points between the filtered-out frequency points and the reference modulation frequency of the baseband digital signal; selecting the largest frequency difference as the frequency shift between the received RF signal and the RF signal transmitted from the vehicle in front.

Figure 7:
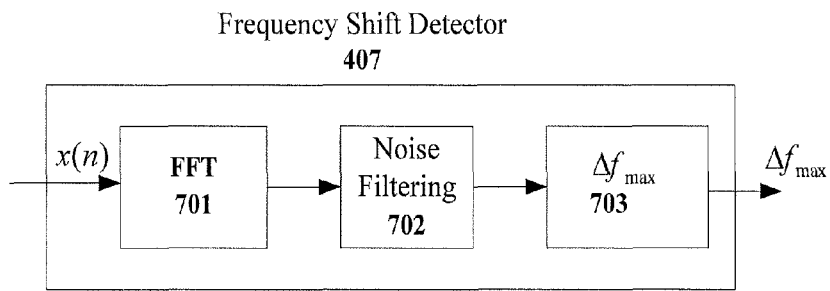
FIG. 7 shows a block diagram of performing frequency shift detection according to a third embodiment of the invention.

FIG. 7 shows a block diagram of performing frequency shift detection according to a third embodiment of the invention. A digital complex single signal is still taken as an example of the digital baseband signal S1 inputted by a transmitter NCO. Frequency of continuous complex single signal x(t) is $f_s$, and x(t) is represented as:

$$x(t) = \cos(2\pi f_s t) + j \sin(2\pi f_s t); \tag{12}$$

Frequency of digital sampling is $f_k$, ($f_k \geq 2f_s$), and the generated digital complex single signal is:

$$x(n) = \cos\left(\frac{2\pi n f_s}{f_k}\right) + j\sin\left(\frac{2\pi n f_s}{f_k}\right); \tag{13}$$

In the module 701, digital complex single signals of N sample points are extracted to perform FFT thereon, thereby obtaining FFT results X(w) of N points. FFT results are complex number of N points, each point corresponds to a frequency point and modular value of each point corresponds to amplitude characteristic of that frequency point.

$$X(w) = \sum_{n=0}^{N-1} x(n)e^{-j2\pi\frac{nw}{N}}, \text{ wherein } x(n) = \cos\left(\frac{2\pi n f_s}{f_k}\right) + j\sin\left(\frac{2\pi n f_s}{f_k}\right); \quad (14)$$

In the module 702, frequency points in the N points whose amplitudes are smaller than a given valid amplitude are filtered out to remove invalid noise, thereby leaving M frequency points (M≤N).

In the module 703, frequency value f(n) of $n^{th}$ point in the M frequency points is calculated according to $$f(n) = \frac{(n-1)f_k}{N}.$$

Frequency difference $\Delta f = f(n) - f_s$ of each frequency point in the M frequency points is obtained by comparing frequency value f(n) and $f_s$, and the largest frequency difference $\Delta f_{max}$ is selected as the frequency shift to be outputted.

Those skilled in the art can appreciate that, FFT is just one approach for performing transformation from time domain to frequency domain, and there may be various other ways for performing transformation from time domain to frequency domain than FFT, such as Fourier transform, wavelet transform, Haar transform, Discrete Cosine Transform (DCT), Discrete Hart Transform (DHT) and time-frequency distribution etc, which are not described here for brevity.

In operation S204, judging whether the frequency shift reaches a set threshold; and in operation S205, determining that driving condition in front is abnormal in response to the judging result being yes. Specifically, the calculated $\Delta f$ is compared with the set threshold of the frequency shift, for example, the threshold of the frequency shift is set as 100 Hz, which corresponds to a relative speed difference of about 50 km/h if a carrier frequency of 2.4 G is adopted. According to an embodiment of the invention, if $\Delta f$ exceeds the threshold, alert information may be issued to warn the driver of the local vehicle that the speed of some vehicle in front is abnormal and protective measure needs to be taken proactively to decelerate speed. According to another embodiment of the invention, if $\Delta f$ exceeds the threshold, throttle or brake device may also be automatically controlled to decelerate speed to a safe level.

The method of detecting abnormal driving condition according to an embodiment of the invention further comprises: transmitting a RF signal to a vehicle behind via a directional antenna, so as to prevent interference imposed on the vehicle behind due to receiving RF signal(s) transmitted from vehicle(s) in front at a different lane.

In a practical application, the method of detecting abnormal driving condition according to an embodiment of the invention may be implemented as an in-vehicle transceiver, which transmits a RF signal to vehicle behind while receiving RF signal transmitted from a vehicle in front; for detailed implementation of the transmitter, reference may be made to the description on the in-vehicle transmitter of FIG. 3.

Figure 8:
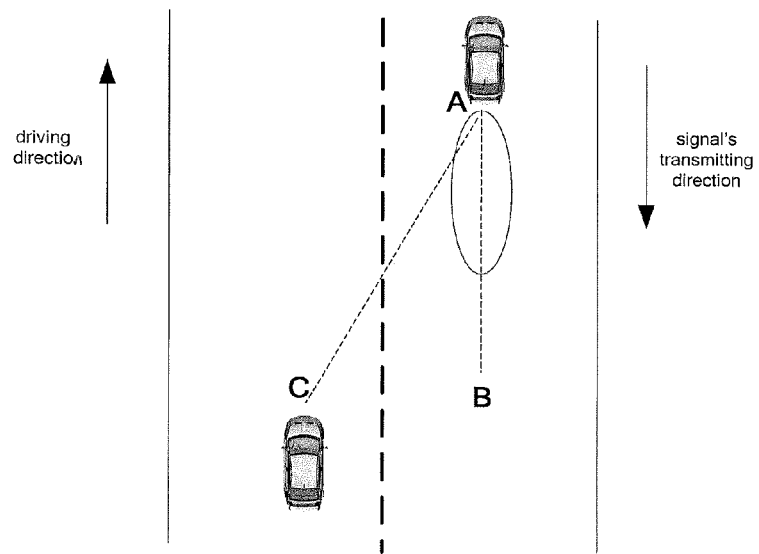
FIG. 8 shows a diagram of antenna gain characteristic of the in-vehicle transmitter according to an embodiment of the invention.

FIG. 8 shows a diagram of antenna gain characteristic of the in-vehicle transmitter according to an embodiment of the invention. A vehicle in front transmits a RF signal to a vehicle behind via a directional antenna, the ellipse therein shows the gain characteristic graph of the directional antenna, which means that transmitting power of the directional antenna is converged on central axis AB of the ellipse. When propagation direction AC of the RF signal transmitted from the vehicle in front deviates from the central axis AB, transmitting energy will drop sharply, especially when distance from the vehicle in front to the vehicle behind is getting closer and closer, the larger the angle that propagation direction AC deviates from AB, the smaller the signal energy received by the vehicle behind. Since Doppler shift is proportional to relative speed component of both vehicles (front and behind) on line AC, the nearer the distance between two vehicles, the smaller the relative speed component of both vehicles on line AC.

Accordingly, smaller Doppler shift can be filtered out by vehicle at behind when performing frequency shift detection. The possibility of false alarm can be suppressed to a very low level.

The in-vehicle transceiver according to embodiments of the invention may be disposed on a car flexibly and portably, for example, it can be distributed to vehicles by management department of freeway at entrance of the freeway. It can issue an alarm that driving condition of a vehicle in front is abnormal when traveling on the freeway to remind driver to decelerate, or the in-vehicle transceiver can control a throttle device and a brake device to reduce speed of the vehicle to a safe level, so as to guarantee safety in driving the vehicle, thus reducing rear-end collision accident.

Figure 9:
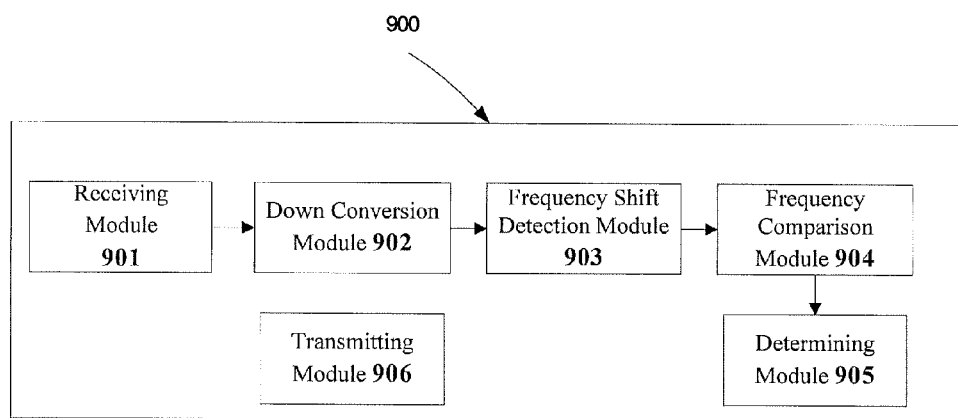
FIG. 9 shows an apparatus 900 of detecting abnormal driving condition according to an embodiment of the invention.

Based on a same inventive conception, the invention provides an apparatus of detecting abnormal driving condition, and FIG. 9 shows an apparatus 900 of detecting abnormal driving condition according to an embodiment of the invention, the apparatus including: a receiving module 901 configured to receive a RF signal transmitted from a vehicle in front; a digital down conversion module 902 configured to perform digital down conversion on the RF signal to obtain a baseband digital signal; a frequency shift detection module 903 configured to perform frequency shift detection on the baseband digital signal to obtain frequency shift between the received RF signal and the RF signal transmitted from the vehicle in front; a frequency comparison module 904 configured to judge whether the frequency shift reaches a set threshold; a determining module 905 configured to determine that driving condition in front is abnormal in response to the judging result being yes.

According to an embodiment of the invention, wherein the frequency shift detection module 903 comprises: a sample point obtaining module configured to obtain adjacent first sample point and second sample point of the baseband digital signal; a complex vector representing module configured to represent the first sample point as a first complex vector and to represent the second sample point as a second complex vector; a phase difference computing module configured to compute phase difference between the first complex vector and the second complex vector; a frequency shift computing module configured to compute frequency shift between the received RF signal and the RF signal transmitted from the vehicle in front based on the phase difference.

According to an embodiment of the invention, wherein the frequency shift detection module 903 comprises: a sample point obtaining module configured to obtain a plurality of continuous sample points of the baseband digital signal; a complex vector representing module configured to represent the plurality of continuous sample points as complex vectors; a phase difference computing module configured to compute phase differences between complex vectors corresponding to adjacent sample points in the plurality of continuous sample points; an average phase difference obtaining module configured to perform weighted averaging on the phase differences to obtain average phase difference; a frequency shift computing module configured to compute frequency shift between the received RF signal and the RF signal transmitted from the vehicle in front based on the average phase difference.

According to an embodiment of the invention, wherein the frequency shift detection module 903 comprises: a sample point obtaining module configured to obtain sample points of the baseband digital signal; a time frequency transformation module configured to perform time frequency transformation on the sample points of the baseband digital signal to obtain a set of amplitudes corresponding to a set of frequency points; an amplitude comparison module configured to compare the amplitudes with a preset valid amplitude; a frequency point filtering module configured to filter out frequency points corresponding to amplitudes which are greater than the valid amplitude; a frequency difference computing module configured to compute frequency difference for each of the filtered-out frequency points between the filtered-out frequency points and a reference modulation frequency of the baseband digital signal, and to select the largest frequency difference as the frequency shift.

According to an embodiment of the invention, the apparatus further comprises: a low pass filtering module configured to perform low pass filtering on the baseband digital signal before performing frequency shift detection on the baseband digital signal.

According to an embodiment of the invention, the apparatus further comprises: a transmitting module 906 configured to transmit a RF signal to a vehicle behind via a directional antenna.

For detailed implementation of the above modules, reference may be made to the detailed description on the method of detecting abnormal driving condition, wherein for the detailed implementation of the frequency shift detection module 903, reference may be made to that of the frequency shift detector 407, and for the detailed implementation of the transmitting module 906, reference may be made to that of the transmitter in FIG. 3, which will not be described herein for brevity.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of detecting an abnormal driving condition, the method comprising:
    receiving, by a first vehicle, an RF signal transmitted from a second vehicle located in front of the first vehicle;
    performing digital down conversion on the RF signal to obtain a baseband digital signal;
    performing frequency shift detection on the baseband digital signal to obtain a frequency shift between the received RF signal and the RF signal transmitted from the second vehicle; and
    determining that the abnormal driving condition of the second vehicle exists responsive to determining that the frequency shift has reached a set threshold.

2. The method according to claim 1, wherein performing frequency shift detection on the baseband digital signal to obtain frequency shift between the received RF signal and the RF signal transmitted from the vehicle in front comprises:
    obtaining adjacent first sample point and second sample point of the baseband digital signal;
    representing the first sample point as a first complex vector;
    representing the second sample point as a second complex vector;
    computing phase difference between the first complex vector and the second complex vector;
    computing frequency shift between the received RF signal and the RF signal transmitted from the vehicle in front based on the phase difference.

3. The method according to claim 1, wherein performing frequency shift detection on the baseband digital signal to obtain frequency shift between the received RF signal and the RF signal transmitted from the vehicle in front comprises:
    obtaining a plurality of continuous sample points of the baseband digital signal;
    representing the plurality of continuous sample points as complex vectors;
    computing phase differences between complex vectors corresponding to adjacent sample points in the plurality of continuous sample points;
    performing weighted averaging on the phase differences to obtain average phase difference;
    computing frequency shift between the received RF signal and the RF signal transmitted from the second vehicle based on the average phase difference.

4. The method according to claim 1, wherein performing frequency shift detection on the baseband digital signal to obtain frequency shift between the received RF signal and the RF signal transmitted from the second vehicle comprises:
    obtaining sample points of the baseband digital signal;
    performing time frequency transformation on the sample points of the baseband digital signal to obtain a set of amplitudes corresponding to a set of frequency points;
    comparing the amplitudes with a preset valid amplitude;
    filtering out frequency points corresponding to amplitudes which are greater than the valid amplitude;
    computing frequency difference for each of the filtered-out frequency points between the filtered-out frequency points and a reference modulation frequency of the baseband digital signal;
    selecting a largest frequency difference as frequency shift between the received RF signal and the RF signal transmitted from the vehicle in front.

5. The method according to claim 1, wherein, before performing frequency shift detection on the baseband digital signal, the method further comprising:
   performing low pass filtering on the baseband digital signal.

6. The method according to claim 5, further comprising:
   transmitting another RF signal to a third vehicle behind the first vehicle via a directional antenna.

* * * * *